C. M. AUMENT.
SPRING SUSPENSION.
APPLICATION FILED FEB. 13, 1917. RENEWED NOV. 26, 1918.

1,289,600.

Patented Dec. 31, 1918.
4 SHEETS—SHEET 1.

Inventor
C. M. Aument,
By Norman T. Whitaker
his Attorney

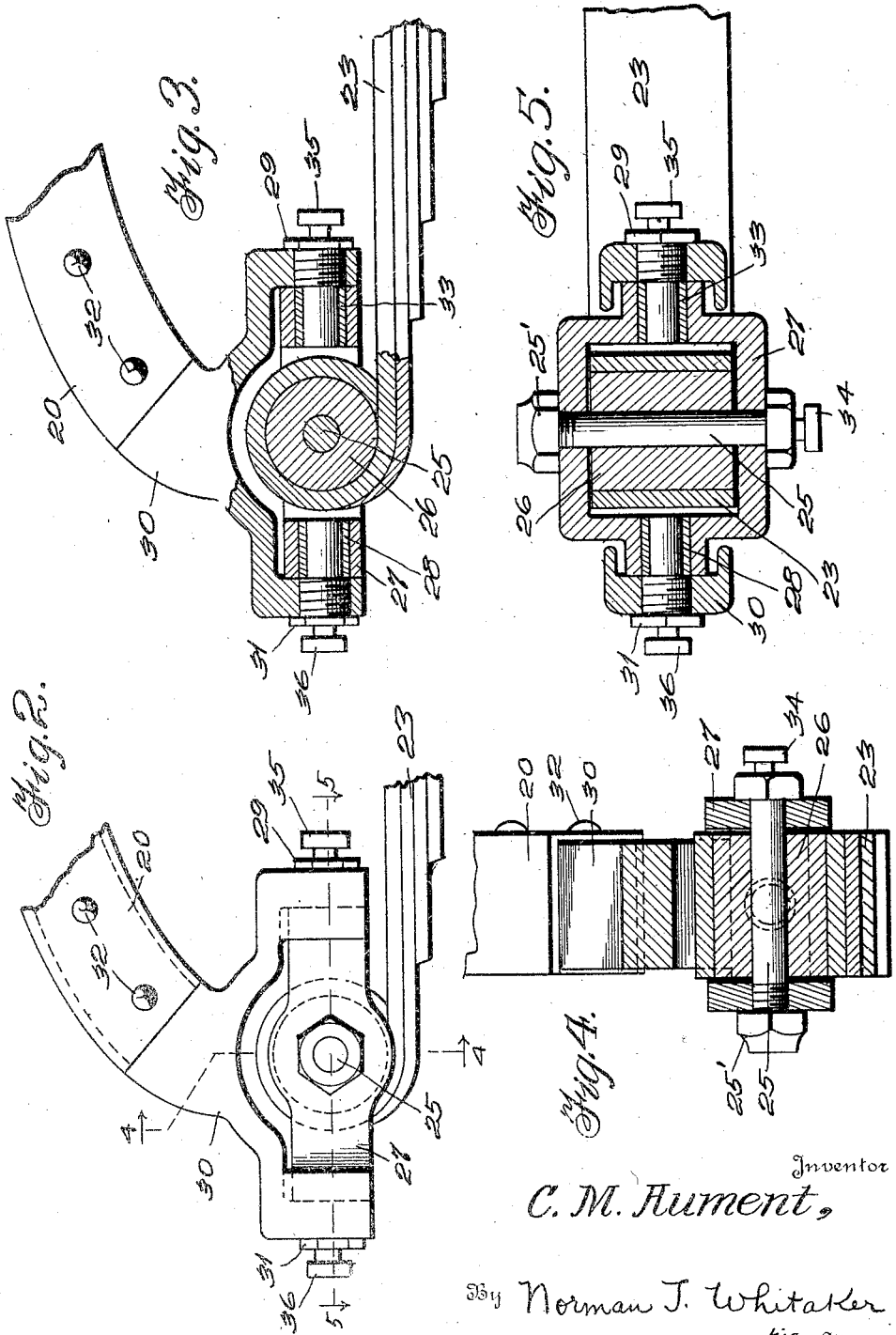

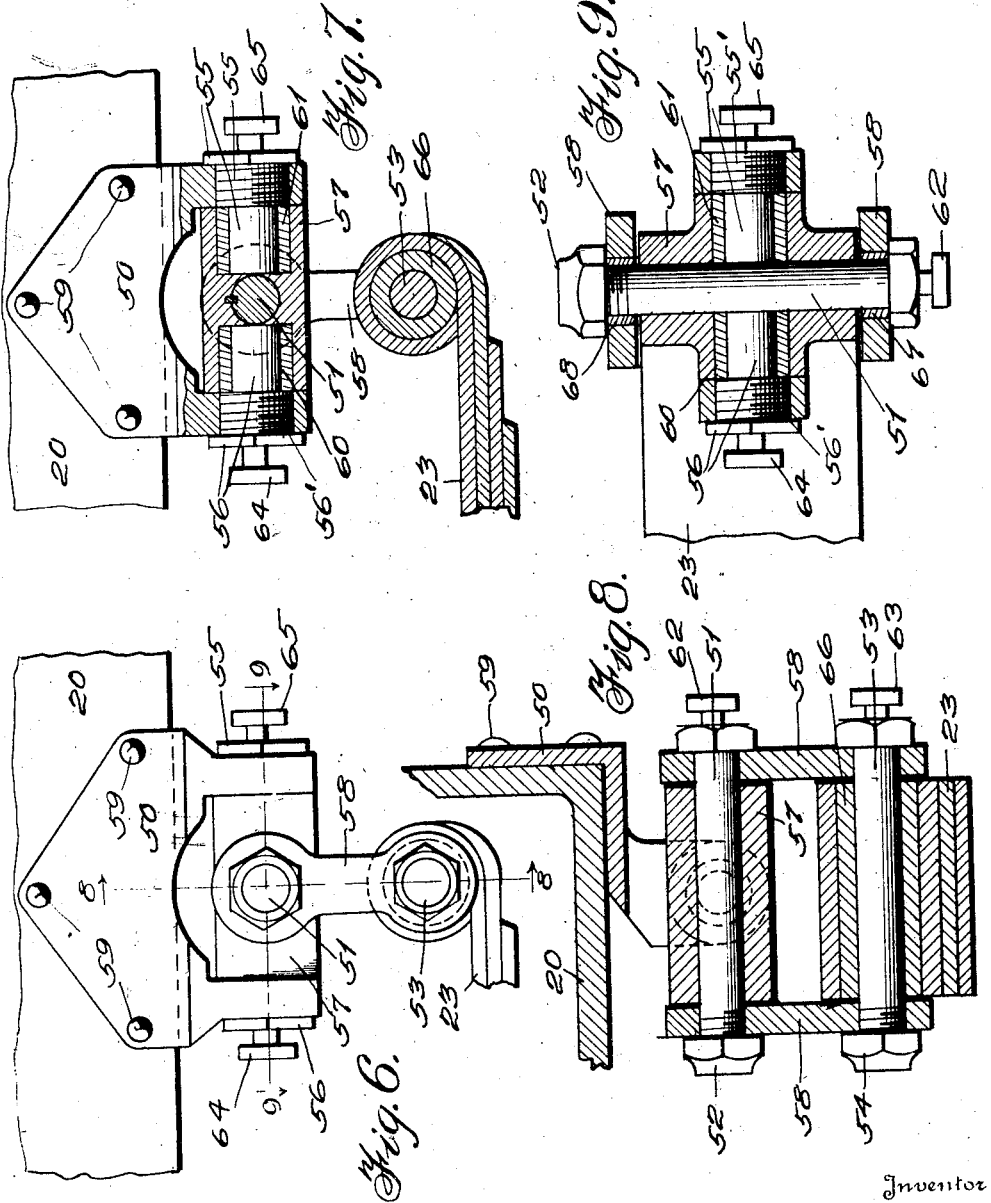

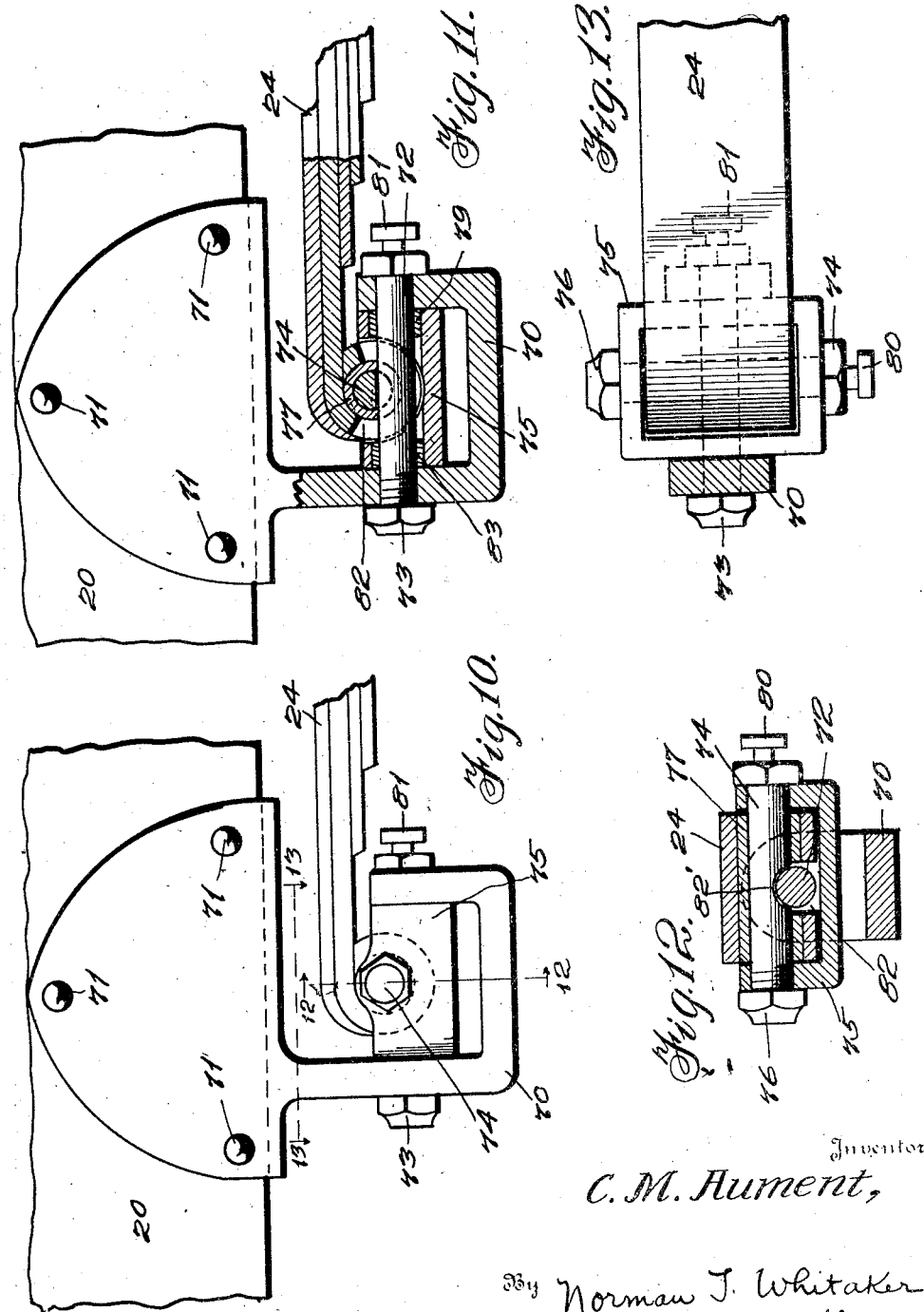

UNITED STATES PATENT OFFICE.

CARROLL M. AUMENT, OF NEW BRUNSWICK, NEW JERSEY.

SPRING SUSPENSION.

1,289,600.  Specification of Letters Patent.  Patented Dec. 31, 1918.

Application filed February 15, 1917, Serial No. 148,885.  Renewed November 26, 1918.  Serial No. 264,247.

*To all whom it may concern:*

Be it known that I, CARROLL M. AUMENT, a citizen of the United States, and resident of New Brunswick, in the county of Middlesex, State of New Jersey, have invented certain new and useful Improvements in Spring Suspensions, of which the following is a specification.

This invention relates to certain new and useful improvements in the mounting of springs. The invention is shown as applied to the front and rear axles of the frame of a vehicle.

The drawings show the construction connected to an automobile but the structure could equally as well be used in the manufacture of other vehicles, such as airplanes, motor trucks, carriages, etc.

The drawings also show the invention as applied to semi-elliptic springs, but I do not limit its use to semi-elliptic springs as it could equally as well be applied to cantaliver, three-quarter elliptic, platfrom or any other type of spring suspension.

An object of the invention is to provide a spring suspension in which the pitching and rolling movements of the axles are not transmitted to the frame. By pitching movement, I mean the movement of the body of the vehicle about a transverse axis; by rolling movement I mean the movement of the vehicle about a longitudinal axis. As is well known, an automobile can vibrate in a number of different ways, not only the pitching and rolling movements, recited above, but it can oscillate by plunging that is straight oscillations up and down, secondary vibrations, such as yawning fore-and-aft, swing and transverse swinging not being considered.

It is frequently the case in going over bad roads in a vehicle, that one wheel is raised a considerable distance higher than the other and may at the same time have a tendency to move the axle transversely. The laminated spring having very little resiliency in a transverse direction and the present day shackle or link construction, as applied to spring suspension, having no transverse movement, it is found that the transverse shocks are transmitted to the frame, occasioning discomfort to the occupants of the vehicle.

With the present day construction in the above condition, that is, with one wheel higher than the other and the frame of the vehicle tending to remain level, the center of the laminated springs being fastened rigidly to the axles, the springs can only move in a longitudinal direction.

With this spring construction although the center of the springs remain rigidly secured to the axles as heretofore, both ends of the springs are allowed to move in a transverse as well as in a longitudinal direction. This relieves the laminated springs of a very great amount of twisting strain and transverse shocks. Obviously, such construction would be of great benefit and comfort and permit easy riding in vehicles, particularly automobiles. By eliminating these twisting strains and transverse shocks, the durability of the laminated springs is prolonged as well as the lateral flexibility increased. This also gives the vehicle more power and flexibility.

An additional object of the invention is to provide means to relieve the present shackle or link construction as applied to spring suspensions of twisting strains and transverse shocks, thus prolonging their durability and efficiency.

A still further object of the invention is to provide a spring suspension of a type which will permit the body and frame and all necessary parts of the vehicle to remain at a constant level, thus eliminating distortion of the motor, increasing the efficiency of said motor consequently that of the vehicle.

The above and other objects and advantages of my invention will fully appear from the following description taken in connection with the accompanying drawings and be explicitly defined in the appended claims. I wish it understood, however, that this disclosure is illustrative only and that the principle of my invention can be embodied in constructions other than the one specified herein.

On the drawings, in which similar reference characters indicate like parts throughout the several views, Figure 1 is a side view of an automobile chassis equipped with my invention.

Fig. 2 is a side elevation of the front end of the front spring mounting.

Fig. 3 is a longitudinal and vertical cross sectional view of Fig. 2.

Fig. 4 is a vertical cross sectional view taken on the line 4—4 of Fig. 2.

Fig. 5 is a horizontal cross sectional view taken on the line 5—5 of Fig. 2.

Fig. 6 is a side elevation of the rear end of the front spring mounting.

Fig. 7 is a longitudinal and vertical cross sectional view of Fig. 6.

Fig. 8 is a vertical cross sectional view taken on the line 8—8 of Fig. 6.

Fig. 9 is a horizontal cross sectional view taken on the line 9—9 of Fig. 6.

Fig. 10 is a side elevation of the front end of the rear spring mounting.

Fig. 11 is a longitudinal and vertical cross sectional view of Fig. 10.

Fig. 12 is a vertical cross sectional view taken on the line 12—12 of Fig. 10.

Fig. 13 is a horizontal cross sectional view taken on the line 13—13 of Fig. 10.

Figure 1:
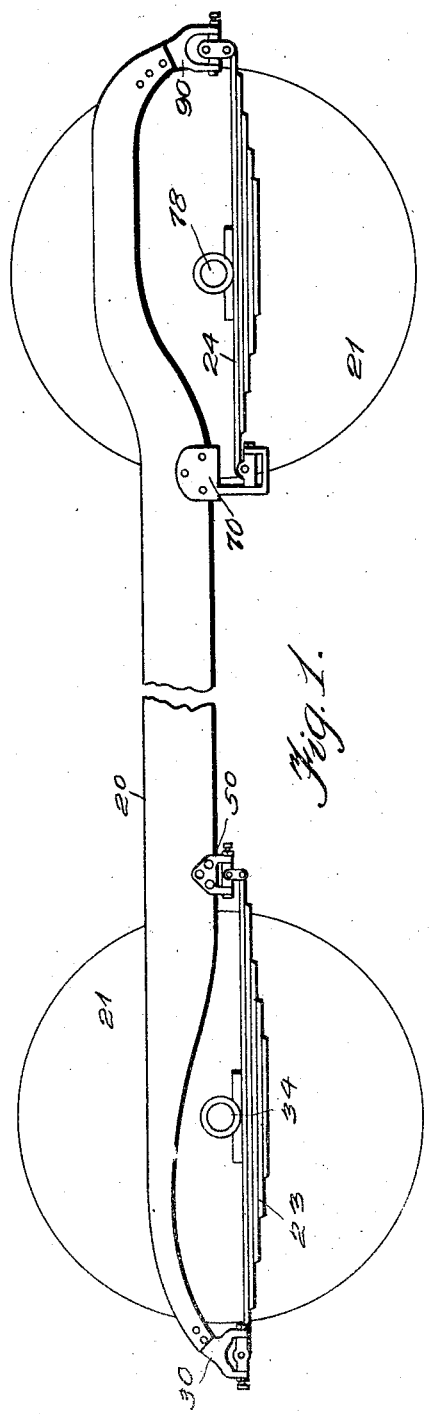

Referring to the drawings, the numeral 20 designates the frame of an automobile having wheels 21 associated therewith in the usual manner. Mounted upon the frame 20 are a plurality of brackets numbered, respectively, 30, 50, 70 and 90 which will be more particularly hereinafter described. Connected between the brackets 30 and 50 are laminated springs 23 and between brackets 70 and 90 are connected similar laminated springs 24.

As clearly shown in Figs. 2 to 5 inclusive which illustrate the mounting of the front end of the front spring, the front end of laminated spring 23 has the usual type eye with bushing 26 inserted in it. Bolt 25 passes through bushing 26 fastening laminated spring 23 to cross 27 and is held in place by nut 25'. Cross 27 is allowed to oscillate on studs 29 and 31, they being held in place by being screwed into bracket 30.

It is to be noted that studs 29 and 31 are mounted in the same horizontal plane 5—5 as bolt 25 which will not allow the front axle 34 to ride or slide back any farther than its original mounting. Studs 29 and 31 are placed at substantially right angles to the axis of bolt 25. Bracket 30 is held to the frame 20 by rivets 32. Studs 29 and 31 and bolt 25 have the usual grease cups for lubrication as shown at 34, 35 and 36. Cross 27 may have bushings as shown at 28 and 33 to reduce wear, eliminate friction and permit the parts to be easily lubricated.

Referring to the construction shown in Figs 1 to 5 inclusive, the operation is as follows: Laminated spring 23 is fastened rigidly about the middle thereof to axle 34. The front end of laminated spring 23 is connected to frame 20 through bracket 30. It is a well known fact that both pitching and rolling shocks are transmitted from axle 34 to laminated spring 23, consequently to the frame 20. Pitching shocks are taken care of as in the usual spring construction, by spring 23 turning by its eye on bolt 25. Rolling shocks are thrown into the frame 20 of the vehicle in the ordinary spring construction, but in this construction, practically all of the rolling shocks are eliminated. This is accomplished by laminated springs 23 together with cross 27 which is bolted to the forward eye of the laminated spring 23, permitting the cross 27 to oscillate upon studs 29 and 31, said studs being screwed in bracket 30.

Cross 27 connected to laminated spring 23 turns on studs 29 and 31 eliminating twisting strains and rolling shocks, thus allowing spring to yield freely in a longitudinal direction. These strains and shocks being eliminated from the springs, they cannot be transmitted to the frame 20. The mounting construction will wear longer being relieved of all strains. The springs will have a better resiliency. It is also found that the motor is distorted much less due to uneven road conditions as with this construction there is practically no weaving of the frame, thereby getting more power from the motor.

Summarizing the above important advantages, it will be obvious that the vehicle presents a more easy riding.

Referring to Figs. 6 to 9 inclusive which illustrate the mounting of the rear end of the front spring, the rear end of the laminated spring 23 has the usual type eye with bushing 66 inserted in it. Bolt 53 passes through bushing 66 securing laminated spring 23 to shackles 58 and bolt 53 is held in place by nut 54. Shackles 58 are permitted to swing in a longitudinal direction by their lower ends turning on bolt 53 and their upper ends turning on bolt 51. The upper end is held in place by bolt 51 carrying nut 52. On line 9—9 of Fig. 6 are studs 55 and 56 being screw-threaded at 55' and 56', respectively, said studs being in the same horizontal plane as bolt 51. This showing is merely illustrative, however, as they could be shown either above or below the center of bolt 51 as long as they are substantially at right angles to the axis of bolt 51. Studs 55 and 56 together with bolt 51 pass through cross 57, while studs 55 and 56 are held in place by being screwed into bracket 50. Bracket 50 is held to frame 20 by rivets 59. Cross 57 is provided with bushings 60 and 61 and shackles 58 having bushings 67 and 68, this reducing wear, and friction and permitting easy lubrication of the parts.

Bolts 51 and 53 have the usual grease cups for lubrication, as shown at 62, 63, 64 and 65.

The operation of the construction shown in Figs. 6 to 9 inclusive, is substantially as follows: The laminated spring 23 is fastened rigidly at its middle or axle 34. The rear end of the laminated spring 23 is connected to the frame 20 through bracket 50. It is a well known fact that both pitching and rolling shocks are transmitted from axle 34 to the laminated spring 23. The pitching shocks are taken care of, as in the usual spring suspension, by the shackles 58 swinging in a longitudinal direction on bolts 51 and 53. Shackles 58 also permit yielding of the leaves of the laminated springs 23 during pitching shocks. The rolling shocks are thrown into frame 20 of the vehicle in the common type of spring suspension, but in this construction the rolling shocks are eliminated by the laminated springs 23 together with shackles 58. The shackles are bolted to the rear eye of the spring 23 and cross 57, said cross being bolted to shackles 58 and turning laterally on studs 55 and 56 which are secured in bracket 50. It will be seen that laminated springs 23 can move not only longitudinally but also with an oscillatory movement. As laminated springs 23 oscillate in relation to studs 55 and 56, all lateral twisting strains and transverse shocks on the laminated springs 23 are eliminated, thus leaving them to yield freely in a longitudinal direction. These strains and shocks being eliminated from the springs, they cannot be transmitted to the frame 20. The shackle construction will wear longer being relieved of all strains. The laminated springs 23 consequently being relieved of these strains, will have a better resiliency. It is also found that the motor is distorted much less due to uneven road conditions as with this construction there is practically no weaving of the frame, thereby getting more power from the motor.

Summarizing the above important advantages, it will be obvious that the vehicle presents more easy riding.

Referring to Figs. 10 to 13 inclusive showing how the front end of the rear spring is suspended; the front end of the laminated spring 24 of the usual type eye has bushing 77 inserted therein. A bolt 72 passes through a slot 82 in the eye and rests in a groove 82' cut in bolt 74. The bolt 74 passes through bushing 77 securing laminated spring 24 to cross 75 and is held in place by nut 76. The cross 75 is adapted to swing laterally from bolt 72. Bolt 72 also passing through the bracket 70. The bracket 70 is secured to the frame 20 by rivets 71. A nut 73 holds bolt 72 in place.

In Figs. 11 and 12, it will be noted that the bolt 74 is above the bolt 72. This construction is illustrative only and these bolts 72 and 74 can be placed in any different horizontal plane, provided they are at substantially right angles to each other. Practical experiments will show that the bolts are well positioned as illustrated in the drawings, the distance between them varying up to one-half inch, depending on the size and weight of the vehicle. The cross 75 is provided with bushings 79 and 83 to reduce the wear, eliminate friction and enable the different parts to be more easily lubricated. It should be noted that the bolts 72 and 74 are provided with grease cups 81 and 80.

The operation of the construction shown in Figs. 10 to 13 inclusive is as follows: The laminated spring 24 is fastened rigidly about the middle thereof to axle 78 (see Fig. 1). The front end of the laminated spring 24 is connected to frame 20 by bracket 70, as above described and illustrated on the drawings. It is a known fact that both pitching and rolling shocks are transmitted from the axle 78 to laminated springs 24. The pitching shocks are taken care of, as in the usual spring suspension, by the eye of laminated spring 24 turning on bolt 74. The rolling shocks are thrown into the frame 20 in the ordinary spring suspension, but in this invention the rolling shocks are taken care of by the laminated springs 24 together with the cross 75 turning laterally on bolt 72, said bolt being fastened into bracket 70. Since bolt 74 may be slightly above or below bolt 72 as desired, the laminated spring 24 will not only oscillate on bolt 72 but can move slightly in a transverse direction by moving on the circumference of a circle of which the radius is the distance between bolts 72 and 74. On most present day vehicles, the front end of the rear laminated spring 24 not only carries its share of the weight but also takes all driving torsion of the rear axle 78 which is transmitted from the motor. It will then be seen that with this construction, all lateral twisting strains and transverse shocks on the laminated springs 24 are eliminated, thus permitting them to yield both in a longitudinal direction and to oscillate. These strains and shocks being eliminated from the springs, they cannot be transmitted to the frame 20. This mounting construction will wear longer than the present day construction, being relieved of all strains and the springs 24 will have a better resiliency and will provide an easier riding motion to the vehicle. The laminated springs 24 because of their oscillatable and longitudinal movements greatly increase the driving torque at the rear wheels of the vehicle.

Figure 15:
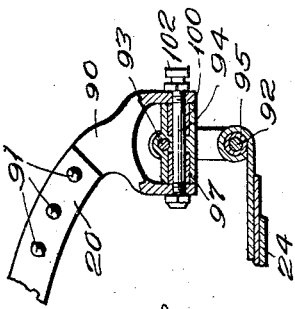
Fig. 15 is a longitudinal and vertical cross sectional view of Fig. 14.
Figure 16:
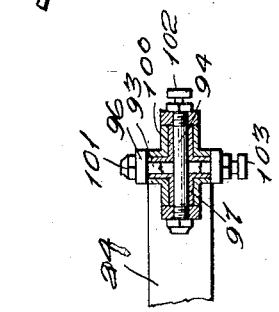
Fig. 16 is a horizontal cross sectional view taken on the line 16—16 of Fig. 14.
Figure 14:
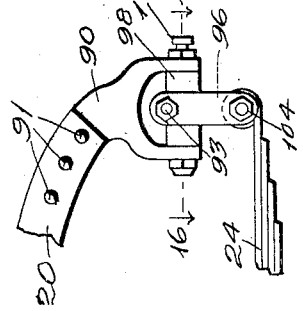
Fig. 14 is a side elevation of the rear end of the rear spring mounting.

Referring now to Figs. 14 to 16 inclusive, the rear end of the laminated spring 24 has the usual type eye provided with bushing 95. A bolt 92 passes through bushing 95 and serves to fasten laminated spring 24 to shackles 96. The bolt 92 is held in place by the nut 104. The shackles 96 swing in a longitudinal direction by their lower ends turning on bolt 92 and their upper ends turning on bolt 93. A nut 101 holds the upper ends of shackles 96 in place on bolt 93. The bolts 93, 94 pass through the cross 98 one above the other with their axes at substantially right angles to each other as clearly shown in Fig. 15. The bolt 94 passes through the bracket 90 and it is obvious that this construction could also be similar to that above described in connection with Figs. 6 to 9 inclusive. A cross 98 is adapted to turn laterally in bracket 90 which is secured to frame 20 by rivets 91. The shackles 96 swing longitudinally on bolt 93 which passes through the cross 98 and is held there by nut 101. The cross 98 is provided with the usual bushings 97 and 100.

The operation of the construction shown in Figs. 14 to 16 inclusive is as follows: A spring 24 is fastened rigidly about the middle thereof to the axle 78. The rear end of spring 24 is connected to the frame 20 by bracket 90, as above described and illustrated in the above three figures. It is a well known fact that both pitching and rolling shocks are transmitted from the axle 78 to laminated spring 24. The pitching shocks are taken care of, as in the usual spring suspension, by the shackles 96 swinging in a longitudinal direction on the bolts 92 and 93. Shackles 96 also permit yielding of the leaves of the laminated spring 24 during pitching shocks. The rolling shocks are thrown into the frame 20 of the vehicle in the common type of spring suspension. In this construction the rolling shocks are eliminated by the laminated spring 24 together with the shackles 96 which are bolted to the rear eye of the spring 24 and cross 98, said cross being bolted to shackles 96 oscillating on bolt 94 which is secured in bracket 90. It will be seen that laminated spring 24 can move not only longitudinally but also transversely. As laminated spring 24 moves transversely in relation to the bolt 93, all oscillating twisting strains and transverse shocks of the laminated spring 24 are eliminated, thus leaving it to yield freely in a longitudinal direction. These strains and shocks being eliminated from the springs, they cannot be transmitted to the frame 20. This also relieves the shackle construction of all lateral torsion or transverse strains and will therefore have a greater resiliency and durability.

The operation of the complete spring suspension is as follows: Assuming that the vehicle is running over a rough road, the wheels 21 are very seldom on the same level, while the frame 20 has a tendency to stay level. To obtain easy riding qualities, the frame must of necessity stay upon a nearly level plane at all times. When, due to uneven road conditions, one or more wheels are higher than others, the springs will naturally be subjected to lateral twisting strains and rolling shocks and this will necessarily throw these lateral strains and rolling shocks into the frame of the vehicle. This together with the pitching movement of the laminated springs and the frame of the vehicle makes a very unpleasant riding vehicle. With this spring suspension all lateral twisting strains and pitching and rolling shocks are practically eliminated from the laminated springs. When these are eliminated, the resiliency of the springs is increased and hence the riding qualities. It should be noted that in this construction as applied to the front spring suspension, the motor cannot be distorted, that is to say, the motor is relieved of all strains that are transmitted to the frame due to uneven road conditions, and by reason of this, the driving torque from the motor to the rear wheels will also be increased. It will further be noted that in this construction as applied to the rear spring suspension, that the laminated springs are adapted to oscillate as well as move longitudinally and by reason of this the driving torque from the motor to the rear wheels will also be increased.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having described my invention what I claim and desire to secure by Letters Patent, is:

1. In a vehicle spring suspension, the combination with a frame and a spring; of a longitudinal and transverse swinging connection between a side member of the frame and one end of the spring; and a connection between the other end of said spring and the frame, said last named connection comprising means for preventing longitudinal movement of one end of the spring with respect to the frame on the one hand and permitting a transverse curvilinear movement of the other end of said spring with respect to the frame on the other hand.

2. In a vehicle spring suspension, the combination with a frame and a spring, of a connection between a side member of the frame and one end of the spring, said connection permitting rotary motion of one end of the spring in a horizontal plane; and a second connection between the frame and the other end of said spring, the second named connection comprising means for preventing longitudinal movement of one end of the spring with respect to the frame and permitting a transverse curvilinear movement of the other end of said spring.

3. In a vehicle spring suspension, the combination with a frame and a spring; of a longitudinal and transverse swinging connection between a side member of the frame and one end of the spring; and a connection between the other end of said spring and said side member, said latter connection comprising a cross, a bracket, and a pivotal connection between the bracket and said cross, said cross being permitted to partake of a transverse curvilinear movement with respect to said frame.

4. In a vehicle suspension, the combination with a frame, an axle, and a spring secured to said axle; of a longitudinal and transverse swinging connection between a side member of the frame and one end of the spring; and a connection between the side member of the frame and the other end of said spring, said latter connection comprising a bracket, a cross journaled longitudinally therein with respect to said frame, said cross being adapted to oscillate within a plane disposed transversely with respect to said frame, and a bolt connecting one end of said spring to said cross, said bolt passing through said cross transversely with respect to said frame.

5. In a vehicle spring suspension, the combination with a frame and a spring; of a longitudinal and transverse swinging connection between a side member of the frame and one end of the spring; and a connection between the side member of the frame and other end of said spring, said connection comprising a bracket secured to said side member, a cross journaled longitudinally therein with respect to said frame, said cross being adapted to oscillate within a plane disposed transversely with respect to said frame, a bushing for reducing friction between said cross and said bracket, and a bolt connecting one end of said spring to said cross, said bolt passing through said cross transversely with respect to said frame.

6. In a vehicle suspension, the combination with a frame and a spring, of a pivotal connection between the frame and one end of the spring, said connection comprising a bracket secured to said frame, a removable bearing carried by said bracket, said bearing being disposed longitudinally with respect to said frame, a cross mounted on said bearing, said cross being adapted to oscillate about said bearing, removable bushings mounted upon said bearing, and a bolt connecting one end of said spring to said cross, said bolt passing through said cross at right-angles to said bearing.

7. In a spring suspension, the combination with a vehicle frame side member, of a spring connected at its opposite ends with the frame member, one end of the spring having a longitudinal and transverse swinging connection with the frame member, the connection at the other end of the spring comprising means for preventing longitudinal movement of the latter end of said spring with respect to said frame member on the one hand, and permitting a transverse curvilinear motion of the former end of said spring with respect to the frame member on the other hand.

8. In a vehicle spring suspension, the combination with a frame and a spring connected at each end thereof to a side member of said frame, of means permitting a relative transverse curvilinear movement of the ends of said spring with respect to said frame, and means for preventing longitudinal movement of one end of the spring with respect to the frame.

9. In a vehicle spring suspension, the combination with a frame, of a front spring, a connection between the forward end of said spring and the frame, said connection comprising a bracket; a removable bearing carried by said bracket, said bearing being disposed longitudinally with respect to said frame, a cross mounted on said bearing, and a bolt connecting the forward end of the front spring to said cross, said bolt being disposed at right-angles to said bearing, the axis of said bolt passing through the axis of said bearing.

10. In a vehicle spring suspension, the combination with a frame, a front spring, and a rear spring, of a connection between the forward end of the front spring and the frame, said connection comprising a bracket; a removable bearing carried by said bracket, said bearing being disposed longitudinally with respect to said frame, a cross mounted on said bearing, said cross being adapted to oscillate about said bearing, and a bolt connecting the forward end of the front spring to said cross, said bolt being disposed at right-angles to said bearing, the axis of said bolt passing through the axis of said bearing, and a connection between the forward end of the rear spring and the frame, said connection comprising a bracket, a removable bearing carried by said bracket, said bearing being disposed longitudinally with respect to said frame, a cross mounted on said bearing, said cross being adapted to oscillate about said bearing, and a bolt connecting the forward end of the rear spring to said cross, said bolt being disposed at right-angles to said bearing.

11. In a vehicle spring suspension, the combination with a frame and a spring connected at each end thereof to a side member of said frame, of means permitting a relative transverse curvilinear movement of the ends of said spring with respect to said frame, means for preventing longitudinal movement of the front end of the spring with respect to said frame, and means for permitting the rear end of the spring to move longitudinally with respect to said frame.

CARROLL M. AUMENT.